United States Patent [19]

Fins

[11] Patent Number: 5,237,912
[45] Date of Patent: Aug. 24, 1993

[54] HEATING AND COOKING APPARATUS

[76] Inventor: Todd Fins, 232 Saddlebow Rd., Bell Canyon, Calif. 91307

[21] Appl. No.: 921,061

[22] Filed: Jul. 29, 1992

[51] Int. Cl.$^5$ .............................. A47J 37/07
[52] U.S. Cl. ........................... 99/393; 99/400; 99/402; 126/41 R; 126/92 B
[58] Field of Search ............... 99/391, 393, 399, 400, 99/402; 126/41 R, 30, 91 R, 92 AC, 92 B; 211/119

[56] References Cited

U.S. PATENT DOCUMENTS

| | | | |
|---|---|---|---|
| 1,733,137 | 10/1929 | Spang | 99/402 |
| 2,048,769 | 7/1936 | Anderson | 99/393 |
| 2,201,756 | 5/1940 | Avetta | 99/393 |
| 2,693,751 | 11/1959 | Allen | 99/393 |
| 2,868,111 | 1/1959 | Laskowski | 126/41 R |
| 2,975,698 | 3/1961 | Miller | 99/402 |
| 3,362,393 | 1/1968 | Arnold | 126/41 R |
| 3,581,654 | 6/1971 | Tescula | 99/402 |
| 4,290,349 | 9/1981 | Fiorenza | 99/402 |
| 4,627,410 | 12/1986 | Jung | 126/41 R |

FOREIGN PATENT DOCUMENTS

| | | | |
|---|---|---|---|
| 2245816 | 5/1973 | Fed. Rep. of Germany | 99/402 |
| 16226 | of 1908 | United Kingdom | 99/393 |
| 26446 | of 1908 | United Kingdom | 99/393 |
| 162819 | 5/1921 | United Kingdom | 99/400 |
| 211767 | 2/1924 | United Kingdom | 99/393 |

Primary Examiner—Harvey C. Hornsby
Assistant Examiner—Mark Spisich
Attorney, Agent, or Firm—J. E. Brunton

[57] ABSTRACT

A combination heating and cooking apparatus that can be used by campers and sportsmen to provide warmth as well as to provide a convenient means for cooking a wide variety of foods at any selected location within the campground. The apparatus is completely self contained with the heating unit being connected directly to a source of heating gas, such as a small propane tank, and with the cooking accessory being removably connected to the heating unit. The cooking accessory adjustably supports the food being cooked directly in the path of the heat radiating from the burner so that the food can be initially seared to seal in its natural juices and can be progressively moved away from the burner to accomplish slow, uniform, no-flare grilling.

12 Claims, 3 Drawing Sheets

HEATING AND COOKING APPARATUS

BACKGROUND OF THE INVENTION

1. Field of the Invention

The present invention relates generally to cooking and heating apparatus. More particularly, the invention concerns an apparatus usable with portable radiant heaters for cooking steaks, fish and the like.

2. Discussion of the Invention

In recent years, portable radiant heaters have become very popular for outdoor camping. The heaters take the place of messy and dangerous campfires and typically comprise one or more arrays of gas operated, ceramic burners which are usually mounted within highly polished reflector units. The ceramic burners are often directly connected to small portable propane tanks, so that the entire assemblage can be readily moved from place to place to provide highly concentrated localized heat. The heating units require no electricity, they are safe, silent and odorless in operation and require no warm-up time.

The thrust of one form of the present invention is to provide a compact, easy to use food cooking accessory that can be directly connected to the radiant heater unit so that the unit can be used not only as a source of warming but also to conveniently cook various kinds of food. For example, foods such as steaks, fish, chicken parts and the like can be securely clamped between cooking racks that comprise a part of the cooking apparatus. The cooking racks can then be adjustably positioned directly in the path of the heat radiating from the ceramic burners so that the food can be quickly and easily cooked at almost any outdoor location.

The cooking accessory, which can be conveniently clamped to the reflector of the standard radiant heater, also includes a convenient drip pan which collects greases and oils emitted from the food as it cooks. The spacing between the cooking racks which clamp the food can easily be adjusted to readily accommodate various foods, such as steaks of different thicknesses. The spacing between the cooking rack and the ceramic burners can also be easily adjusted so as to control the rate of cooking.

SUMMARY OF THE INVENTION

It is an object of the present invention to provide a readily portable combination heating and cooking apparatus that can be used by campers and sportsmen to provide warmth as well as to provide a convenient means for cooking a wide variety of foods at any selected location within the campground.

It is another object of the invention to provide an apparatus of the aforementioned character which is completely self contained with the heating unit being connected directly to a source of heating gas, such as a small propane tank, and with the cooking accessory being removably connected to the heating unit.

Another object of the invention is to provide an apparatus as described in the preceding paragraphs in which the cooking accessory adjustably supports the food being cooked directly in the path of the heat radiating from the burner so that the food can be initially seared to seal in its natural juices and can then be progressively moved away from the burner to accomplish slow, uniform no-flare grilling.

Still another object of the invention is to provide an apparatus of the class described in which fats and oils produced during the cooking step are safely captured within the removable drip pan conveniently disposed beneath the cooking racks.

Another object of the invention is to provide a combination heating and cooking apparatus which is low cost, compact, light weight, easy to use and easy to assemble and disassemble for cleaning, transport and storage.

DESCRIPTION OF THE INVENTION

Figure 1:
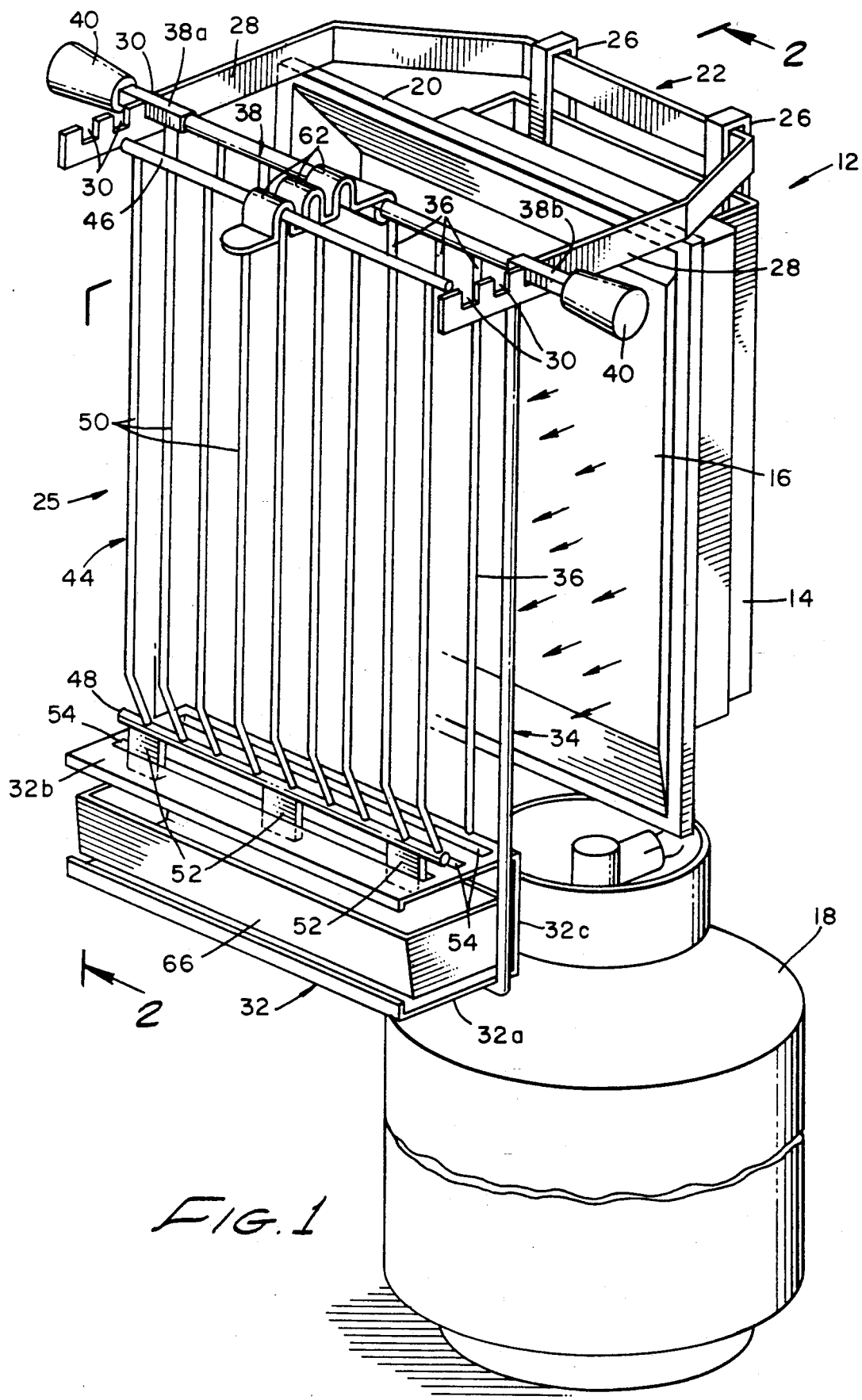
FIG. 1 is a generally perspective view of the cooking apparatus of one form of the invention.
Figure 2:
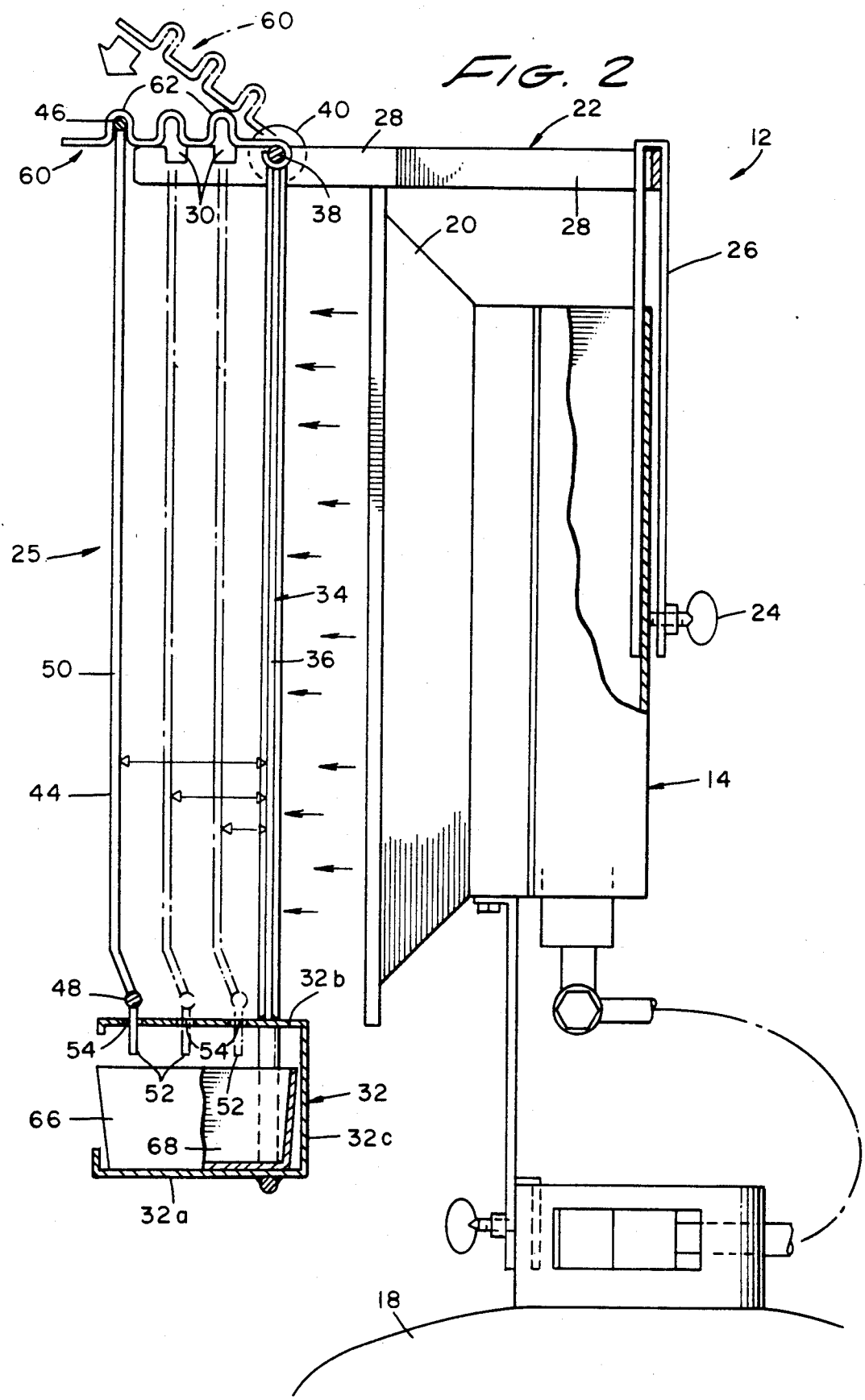
FIG. 2 is a view taken along lines 2—2 of FIG. 1.

Referring to the drawings and particularly to FIGS. 1 and 2, the combination heating and food cooking apparatus of the present invention is there shown and generally designated by the numeral 12. In this form of the invention, the apparatus comprises a gas operated, radiant heating unit 14 including a heating element 16 for radiating heat in a outwardly direction as indicated by the arrows in FIGS. 1 and 2. Heating unit 14 is operably interconnected with a source of gas shown here as a propane tank 18 of the character typically used in connection with campers and mobile homes. Propane tank 18 is of standard construction and is readily commercially available. The tank may vary in size from five gallons of propane or larger.

As best seen by referring to FIG. 2, radiant heating unit 4 also includes a reflector element 20 that circumscribes heating element 16 and functions to reflect radiant energy from the heating element in an outwardly direction. A heating apparatus of this character having an assembly comprising a radiant heating unit and a reflector element mounted on a propane tank is commercially available from TMP Distributors of West Hills, California.

Figure 4:
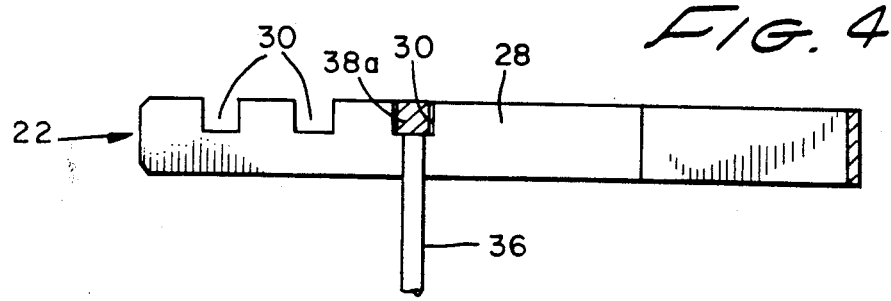
FIG. 4 is an enlarged, fragmentary view illustrating the manner in which a portion of the food holding structure is adjustably carried by the support arms which are interconnected with the source of radiant heat.

In accordance with the present invention, a supporting frame 22 is removably connected to the heating unit by means of a pair of thumb screws 24 (FIG. 2). In the present form of the invention, the supporting frame assembly comprises a pair of transversely spaced, generally vertically extending support elements or legs 26 upon which the thumb screws are mounted, and a pair of transversely spaced-apart support arms 28 which are connected to support legs 26 so that they extend forwardly of heating element 16 in the manner indicated in FIGS. 1 and 2. As best seen in FIGS. 1 and 4, each of the support arms 28 is provided with a plurality of notches 30 located near their outboard ends. The purposes of these notches will presently be described. As indicated in FIG. 2, the entire supporting frame 22 is removably interconnected to the heating unit by means of the thumb screws 24.

Forming an important feature of the apparatus of the present invention is the food holding rack assembly 25 which is supported by the supporting frame. This rack assembly is interconnected with the supporting frame in the manner shown in FIGS. 1 and 2 and depends downwardly from support arms 28 so that the food engaging rack portions of the rack assembly are disposed directly in the path of the heat radiating from the heating element 16.

Figure 3:
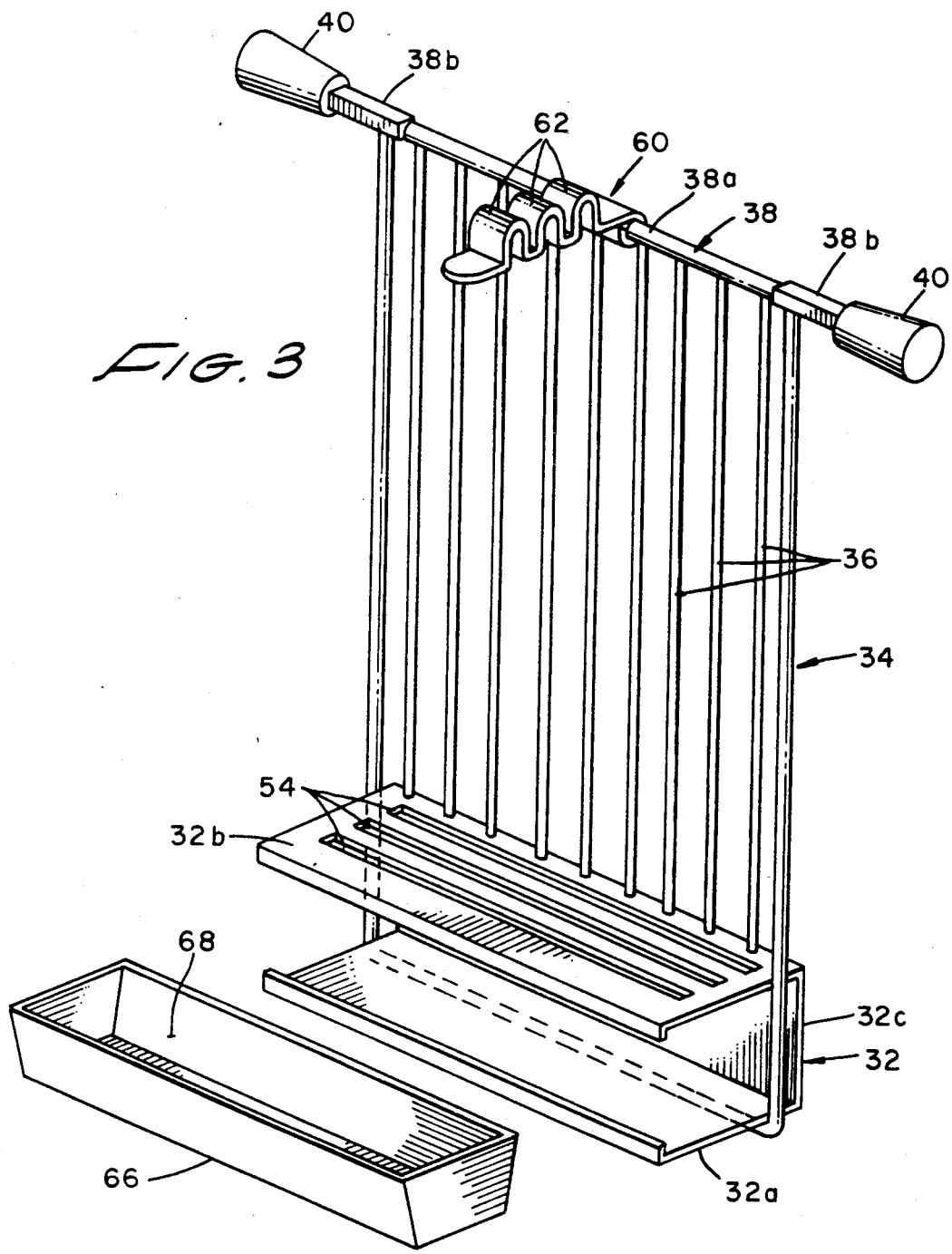
FIG. 3 is a generally perspective, exploded view of the food holding portion of the invention and the grease collection receptacle.

Turning also to FIG. 3 it can be seen that the rack assembly of the present embodiment of the invention comprises a base unit 32 which is generally U-shaped in cross section and includes a base plate 32a, a top plate 32b, and a bite portion 32c. A first food engaging rack 34 is connected to base unit 32 and extends upwardly therefrom in the manner best seen in FIG. 3. First food engaging rack 34 comprises a plurality of transversely spaced-apart, elongated rod-like elements 36 which are connected proximate their lower extremities to upper plate 32b of the base unit 32 and are connected proximate their upper extremities to a transversely extending lifting arm 38. Lifting arm 38 includes a central portion 38a and two end portions 39b which are generally rectangular in cross-section. Lifting handles 40 are connected to end portions 39b for conveniently lifting the rack assembly relative to arms 38. As indicated in FIG. 1, end portions 38b of arms 38 are closely receivable within oppositely disposed notches 30 provided in support arms 28. End portions 39b of rod 38 fit closely within the U-shaped notches 30 so as to prevent rocking of the food holding rack assembly relative to the heating element.

The food holding rack assembly of this form of the invention also includes a second food engaging rack 44 (FIG. 1) which comprises first and second, vertically spaced-apart connector rods 46 and 48. Disposed between connector rods 46 and 48 are a plurality of transversely spaced-apart, elongated rod-like elements 50. As best seen in FIGS. 1 and 2, depending downwardly from rod 48 are a plurality of transversely spaced-apart tab-like elements 52. Tab elements 52 are closely receivable within a selected one of three transversally extending, longitudinally-spaced slots 54 provided in top plate 32b of base unit 32 (see also FIG. 3). With this arrangement, it will be appreciated that the spacing between the first and second food engaging racks can be varied by inserting tab-like elements 52 in a selected slot 54. More particularly, as illustrated in FIG. 2, if elements 52 are inserted into the slot 54 which is disposed closest to the first food a minimum spacing between the food engaging racks will be achieved. On the other hand, if elements 52 are inserted in the slot 54 which is disposed furthest away from the first food engaging rack the maximum rack spacing will be achieved. To lock the top ends of the second food engaging rack in a position to maintain parallelism between the first and second racks appropriate locking means are provided. This locking means is shown here as a locking element 60 which is pivotally connected at one end to arm 38. Provided proximate the opposite end of element 60 are interengagement means for engagement with rod 46 of the second food engaging rack. It is to be noted that element 60 includes three transversely spaced-apart, generally U-shaped segments 62 within which rod 46 can be closely received. Segments 62 are spaced apart the same distance as are slots 54 provided in base plate 32. With this construction, the parallel relationship between the first and second food engaging racks can be maintained in each rack spacing orientation.

Turning to FIG. 3, it is to be observed that the rack assembly of the present invention also includes a catch basin or pan-like structure 66 having an internal reservoir 68. The catch basin is supported by base plate 32a at a location directly beneath the transversely-spaced slots 54 provided in the plate so that any oil or grease dropping from the food during cooking will be safely captured within reservoir 68 for convenient later disposal.

In using the apparatus of the invention, the first rack assembly in the configuration shown in FIG. 3 is laid flat on a table or similar flat surface. The food to be cooked, such as a steak, is then centrally positioned on rods 36. Next, the second food engaging rack is then interconnected with base plate 32a by inserting tabs 54 into one of the three slots 54 provided in the plate 32b. Which slot 54 is selected depends upon the thickness of the food article being cooked, the object being to clamp the food article securely between the first and second food engaging racks. After the food article has been clamped in position between the racks, the locking means or locking element 62 is swung into position so that the current one of the U-shaped segments can be fitted over upper rod 46 of the second food engaging rack. With the locking element thusly located in a locked position, the food article to be cooked will remain securely clamped between the first and second food engaging racks during the cooking step.

The entire structure thus formed is lifted by handles 44 and end portions 39b are inserted into a selected pair of oppositely disposed notches 30 provided in forwardly extending support arms 28. If the food article being cooked is a steak, the device is preferably supported within the inboard notches, that is the notches closest to the heating element so that the meat can be initially seared. As cooking progresses, the rack can be moved outwardly relative to the heating element by displacing rod 38 into a selected pair of the outboard notches 30 provided in support arms 28. Because of the extreme heat of the ceramic cooking element 16 any grease that might splatter on the heating element is at once vaporized so that the heating element remains grease free.

After the food article has completely cooked, the catch basin is removed and any grease that has been collected is disposed of. This done, the locking means or locking element 60 can be pivoted about rod 38 so that the second food engaging rack can be removed from the base assembly enabling the cooked food article to be lifted from the first food engaging rack. The food holding rack can be cleaned and returned to arms 28, or alternatively it can be stored for use at a later time.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A food cooking apparatus for use in combination with a portable radiant heater of the character having a heating element for radiating heat in an outward path and a source of gas interconnected with the heating element, said cooking apparatus comprising:
    (a) a supporting frame comprising:
    (i) a pair of legs transversely spaced relative to the heating element; and
    (ii) a pair of outwardly extending support arms connected to said legs;

(b) a rack assembly adapted to be carried by said support arms for movement toward and away from the heating element, said rack assembly comprising a base unit and a first food engaging rack connected to said base unit, said base unit having first and second spaced-apart surfaces, said second surface having a slot extending transversely of the heating element, and further including a catch basin disposed intermediate said first and second spaced-apart surfaces;

(c) a second food engaging rack connected to said base unit, said second rack being disposed in a generally parallel, spaced-apart relationship with said first rack and having a tab removably receivable within said slot; and (d) connector means for connecting said supporting frame to the radiant heater so that at least portions of said first and second racks are disposed within the path of the heating radiating from the heating element of the radiant heater.

2. A food cooking apparatus as defined in claim 1 in which said rack assembly further includes locking means connected to said first food engaging rack for engagement with said second food engaging rack to lock said second food engaging rack in a fixed position relative to said first food engaging rack whereby the food to be cooked can be clamped between said first and second racks.

3. A combination heating and food cooking apparatus comprising:

(a) a gas operated radiant heating unit for radiating heat in an outwardly direction;

(b) a source of gas operably connected to said heating unit;

(c) a supporting frame connected to said heating unit, said supporting frame having a pair of spaced-apart support arms extending outwardly relative to said heating unit, each said support arm having at least two notches provided therein;

(d) a food holding rack assembly connected to said support arm and depending downwardly therefrom, said rack assembly including a base unit having spaced-apart first and second surfaces, said second surface having at least two spaced apart slots provided therein, and a first food engaging rack connected to said base unit and disposed in the path of the heat radiating from said heating unit, said first food engaging rack having a plurality of spaced-apart, elongated, rod-like elements connected proximate their lower extremities with said base unit and connected proximate their upper extremities to a lifting arm extending transversely of said heating unit, said lifting arm being receivable within said notches provided in said support arms;

(e) a second food engaging rack connected to said base unit and disposed in a generally parallel, spaced-apart relationship with said first food engaging rack, said second food engaging rack comprising first and second spaced-apart connector rods and a plurality of elongated, rod-like elements spaced transversely relative to said heating unit and disposed intermediate said first and second connector rods, said second connector rod having downwardly depending tabs selectively receivable within said notches provided in said support arms.

4. An apparatus as defined in claim 3 in which said rack assembly further includes a locking element pivotally connected to said lifting arm, said locking element having interengagement means for engagement with said first connector rod of said second food engaging rack for maintaining said first and second food engaging racks in a fixed spaced relationship.

5. An apparatus as defined in claim 4 in which said rack assembly further includes a catch basin carried by said base unit intermediate said first and second surfaces.

6. A combination heating and food cooking apparatus comprising:

(a) a container for containing combustible gases;

(b) a gas operated burner panel connected to said container for radiating heat in an outward direction;

(c) connector means for connecting said burner panel to said container, whereby said panel is superimposed over said container;

(d) a supporting frame connected to said burner panel, said supporting frame having a support arm extending in an outward direction from said burner panel;

(e) a food holding rack assembly connected to said support arm, said rack assembly including a base unit and a first food engaging rack connected to said base unit and disposed in the path of the heat radiating from said burner pane;

(f) a second food engaging rack connected to said base unit and disposed in a generally parallel, spaced-apart relationship with said first food engaging rack.

7. An apparatus as defined in claim 6 in which said container include a body portion and a wall extending from said body portion and in which said connector means comprises a supporting member having a first end connected to said burner panel and a second end connected to said burner panel and a second end connected to said wall of said container.

8. An apparatus as defined in claim 7 in which said connector means further includes means for conducting gas from said container to said burner panel.

9. An apparatus as defined in claim 6 in which said base unit comprises spaced-apart first and second surfaces, said second surface having at least two spaced-apart slots provided therein.

10. An apparatus as defined in claim 9 in which said second food engaging rack includes a plurality of downwardly depending tabs selectively receivable within said slots provided in said second surface of said base unit.

11. A food cooking apparatus as defined in claim 9 in which said rack assembly further includes a catch basin carried by said base unit and disposed intermediate said first and second surfaces.

12. A food cooking apparatus as defined in claim 9 in which said rack assembly further includes locking means connected to said first food engaging rack for engagement with said second food engaging rack to lock said second food engaging rack in a fixed position relative to said first food engaging rack whereby the food to be cooked can be clamped between said first and second racks.

* * * * *